United States Patent
Motoyama (10) Patent No.: US 7,432,854 B2
(45) Date of Patent: *Oct. 7, 2008

(54) SIMPLE DEVICE AND METHOD TO RETURN A USER TO A LOCATION

(75) Inventor: Tetsuro Motoyama, Cupertiino, CA (US)

(73) Assignee: Ricoh Company Limited, Tokyo (JP)

( * ) Notice: Subject to any disclaimer, the term of this patent is extended or adjusted under 35 U.S.C. 154(b) by 129 days.

This patent is subject to a terminal disclaimer.

(21) Appl. No.: 11/109,640

(22) Filed: Apr. 20, 2005

(65) Prior Publication Data

US 2005/0242989 A1   Nov. 3, 2005

Related U.S. Application Data

(63) Continuation-in-part of application No. 10/636,561, filed on Aug. 8, 2003.

(51) Int. Cl.
*G01S 5/14* (2006.01)
*G01C 21/30* (2006.01)
*G01C 21/00* (2006.01)
*H04B 1/38* (2006.01)

(52) U.S. Cl. .......................... 342/357.08; 342/357.13; 701/211; 701/213; 455/90.1

(58) Field of Classification Search ............... 342/357, 342/357.01–357.017; 455/90; 356/139
See application file for complete search history.

(56) References Cited

U.S. PATENT DOCUMENTS

| | | | |
|---|---|---|---|
| 5,313,201 A | 5/1994 | Ryan | |
| 5,543,802 A | 8/1996 | Villevieille et al. | |
| 5,925,091 A | 7/1999 | Ando | |
| 6,285,317 B1 * | 9/2001 | Ong | 342/357.13 |
| 6,307,485 B1 * | 10/2001 | Hasegawa | 340/995.15 |
| 6,360,169 B1 | 3/2002 | Dudaney | |
| 6,363,324 B1 * | 3/2002 | Hildebrant | 701/213 |
| 6,407,698 B1 | 6/2002 | Ayed | |
| 6,421,608 B1 | 7/2002 | Motoyama et al. | |

(Continued)

FOREIGN PATENT DOCUMENTS

WO   WO 98/55833 A1   12/1998

(Continued)

OTHER PUBLICATIONS

U.S. Appl. No. 10/636,561, filed Aug. 2003, Motoyama.*

(Continued)

*Primary Examiner*—Thomas H. Tarcza
*Assistant Examiner*—Harry Liu
(74) *Attorney, Agent, or Firm*—Oblon, Spivak, McClelland, Maier & Neustadt, P.C.

(57) ABSTRACT

A low-power location apparatus for returning to a user to a location including a system unit configured to compute a location using radio signals, a user interface unit having a display area and first and second buttons, a memory unit, and a computational unit configured to interact with the first and second buttons. The computation unit retrieves a first location from the system unit and stores the first location in the memory unit upon selection of the first button by the user. Further, the computation unit retrieves a second location from the system unit and calculates a relative three-dimensional direction from the second location to the first location upon selection of the second button by the user. The relative three-dimensional direction is graphically represented on the low-power display area of the user interface unit.

12 Claims, 9 Drawing Sheets

U.S. PATENT DOCUMENTS

| | | | |
|---|---|---|---|
| 6,470,264 | B2 | 10/2002 | Bide |
| 6,489,921 | B1 | 12/2002 | Wilkinson |
| 6,496,205 | B1* | 12/2002 | White et al. ................ 715/824 |
| 6,502,032 | B1* | 12/2002 | Newman .................... 701/213 |
| 6,580,999 | B2 | 6/2003 | Maruyama et al. |
| 6,650,999 | B1 | 11/2003 | Brust et al. |
| 6,725,138 | B2 | 4/2004 | DeLuca et al. |
| 6,738,712 | B1* | 5/2004 | Hildebrant .................. 701/213 |
| 6,763,226 | B1* | 7/2004 | McZeal, Jr. ................ 455/90.2 |
| 6,857,016 | B1 | 2/2005 | Motoyama et al. |
| 2002/0008614 | A1* | 1/2002 | Yeh et al. ................ 340/425.5 |
| 2003/0020638 | A1* | 1/2003 | Sari et al. ................... 340/995 |
| 2003/0139150 | A1* | 7/2003 | Rodriguez et al. ............ 455/90 |
| 2003/0156208 | A1* | 8/2003 | Obradovich ............. 348/231.3 |
| 2004/0243307 | A1* | 12/2004 | Geelen ....................... 701/213 |
| 2005/0114015 | A1 | 5/2005 | Motoyama et al. |
| 2005/0242989 | A1* | 11/2005 | Motoyama ............. 342/357.08 |
| 2006/0100779 | A1* | 5/2006 | Vergin ........................ 701/211 |

OTHER PUBLICATIONS

U.S. Appl. No. 11/861,889, filed Sep. 26, 2007, Motoyama.
U.S. Appl. No. 11/861,875, filed Sep. 26, 2007, Motoyama.

* cited by examiner

SIMPLE DEVICE AND METHOD TO RETURN A USER TO A LOCATION

CROSS-REFERENCE TO RELATED APPLICATIONS

This application is a continuation application of application Ser. No. 10/636,561, filed Aug. 8, 2003, and is related to the following U.S. applications: Ser. No. 09/575,702 filed on Jul. 12, 2000; Ser. No. 10/167,497 filed on Jun. 13, 2002; Ser. No. 09/575,710 filed on Jul. 25, 2000; and Ser. No. 09/668,162 filed on Sep. 25, 2000. The contents of each of the above applications are incorporated herein by reference.

BACKGROUND OF THE INVENTION

1. Field of the Invention

The present invention relates generally to a low-power location device and more specifically to a location system and method using radio-based technology to register a location and then later direct a user back to the registered location.

2. Discussion of the Background

Today, many people have trouble remembering how to return to a particular location such as a common meeting place or where they parked their vehicle. This problem will most likely only get worse as the population ages and the aging generation face problems associated with memory loss. Forgetting where a vehicle is parked can be a serious problem in large parking lots such as malls, shopping centers, or amusement parks. Further, not being able to remember how to return to a gathering location after a period of time is also problematic.

The Global Positioning System (GPS) is an example of a radio-based technology that is used to provide an earth based position using orbiting space satellites. As is well known in the art, currently there are twenty-four GPS space satellites in the GPS constellation orbiting in twelve-hour orbits, 20,200 kilometers above Earth configured such that there are six to eleven GPS satellites visible from any point on the Earth. GPS satellites broadcast specially coded signals that can be processed by GPS receivers. These GPS space satellites transmit on a primary and a secondary radio frequency, referred to as L1 and L2. The frequency of L1 is 1575.42 MHz (154 times the atomic clock) and the frequency of L2 is 1227.6 MHz (120 times the atomic clock). A typical GPS receiver retrieves GPS signals from at least three orbiting GPS space satellites and then calculates an earth based location, generally latitude and longitude coordinates. GPS signals from at least four orbiting GPS space satellites are necessary to calculate a three-dimensional earth based location, such as latitude, longitude and altitude. A GPS receiver calculates its location by correlating the signal delays from the GPS space satellites and combining the result with orbit-correction data sent by the satellites.

At present, there exist many different types of GPS receivers of varied capabilities which are commonly available for personal and governmental use. Typically, these GPS receivers are intended for navigational use in which the current calculated latitude and longitude location is displayed on some form of a geographic or topographical map. These systems are sometimes bulky and may require the user to manually program the system, such as entering a destination street address.

Because a typical user of a device intended to help the user remember how to return to a particular location is likely to be concerned about the size and complexity of the device, the device should be lightweight and simple to operate. Thus, a location device should have a simple user interface that is easy to operate with minimal or no user programming required. To this end, the location device should be able to utilize radio-based technology to automatically determine its current location.

Thus, there exists an unmet need in the art for a lightweight and simple to use location device for registering and returning to a particular location.

SUMMARY OF THE INVENTION

One object of the present invention is to provide a lightweight, low-power, and simple to use location device for locating a particular location based on a previous registration of that location.

Another object of the present invention is to provide a device having a simple and intuitive user interface including a button to register the location to which the user wants to return and a button to activate the direction indicators. A user stores the current location ascertained from a radio-based (e.g., GPS) system unit into a memory unit using a registration button. The user later activates the direction indicators to graphically represent a three-dimensional direction from the current location ascertained from the radio-based system to the previously registered location using a direction button.

Yet another object of the present invention is to provide a device with direction indicators that are active at all times.

Another object of the present invention is to provide a device that can be implemented in the remote lock of a vehicle key or cellular phone in addition to being a universal device.

Accordingly, there is provided a low-power location apparatus for returning a user to a location, comprising: (1) a system unit configured to determine a current location using radio signals; (2) a user interface unit having a low-power display area and first and second buttons; (3) a memory unit; and (4) a computational unit configured to interact with the first and second buttons, wherein the computation unit retrieves a first location from the system unit and stores the first location in the memory unit upon selection of the first button by the user, and the computation unit retrieves a second location from the system unit and calculates a relative three-dimensional direction from the second location to the first location upon selection of the second button by the user. Further, the relative three-dimensional direction is graphically represented on the low-power display unit of the user interface unit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, wherein like reference numerals designate identical or corresponding parts throughout the several views.

Figure 1:
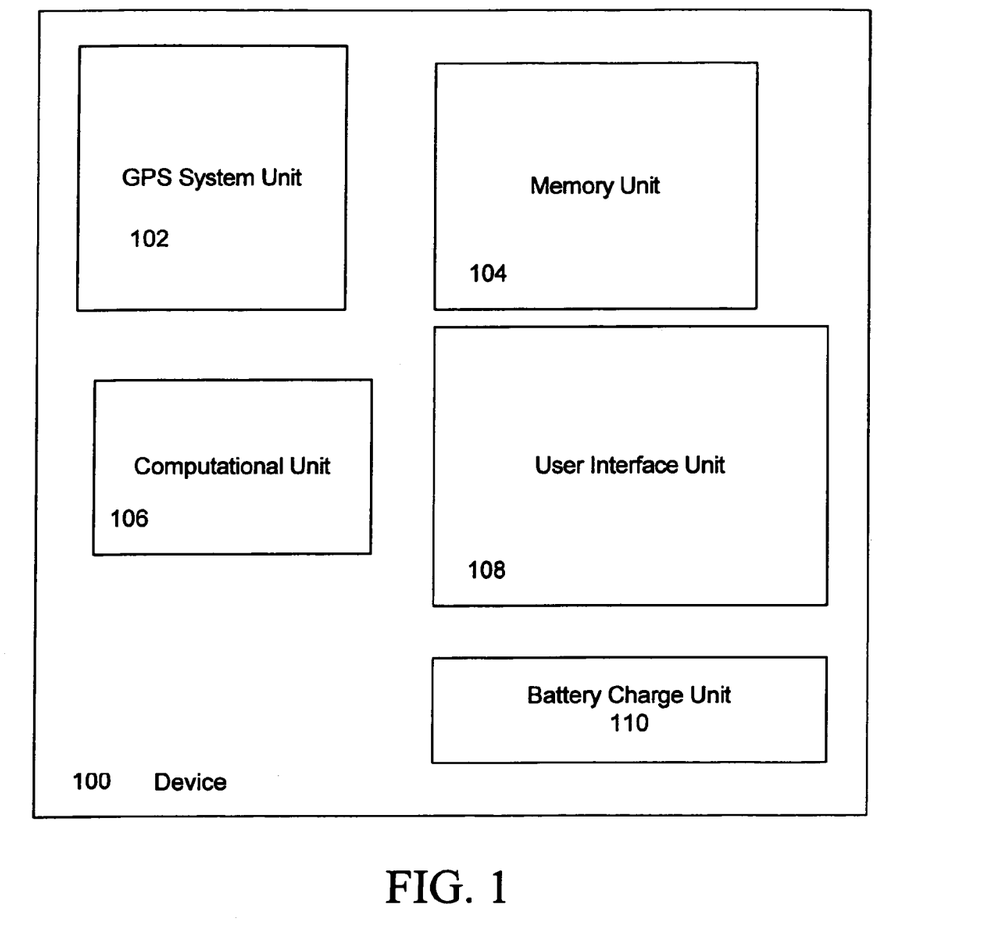
FIG. 1 is a block diagram of a location device according to an embodiment of the present invention.

Referring to FIG. 1, a block diagram of the location device according to an embodiment of the present invention is shown. The location device 100 contains five major subunits (102, 104, 106, 108, and 110). GPS System Unit 102 contains a radio frequency receiver along with a system bus interface, not described, and computer software. The radio frequency receiver receives radio frequency signals from radio-based transmitters (e.g., GPS satellites or ground stations). These radio frequency signals are used by the computer software to calculate a current three-dimensional location of the location device. Memory unit 104 contains the non-volatile and volatile memory that is required to operate the location device and its associated software. Memory Unit 104 may contain dynamic RAM and flash memory along with ROM. Computational Unit 106 includes a CPU which may be implemented as any type of processor including commercially available microprocessors from companies such as Intel, AMD, Motorola, Hitachi and NEC. The Computational Unit 106 is configured to store a three-dimensional location ascertained from the GPS System Unit 102 into Memory Unit 104, to compute a relative three-dimensional direction of the current location of the device relative to the stored location, and to communicate this directional information to User Interface Unit 108. User Interface Unit 108 contains the control logic of the display unit and buttons. The location device has low power requirements. In particular, the display is a low-power display, such as an LED type display or small LCD display used in a watch, and not, e.g., a large LCD display used in PDA or a Laptop computer display. The location device 100 also includes a Battery Charge Unit 110. The charging mechanism of the Battery Charge Unit 110 may be a kinetic or photosensitive device that is used, e.g., in current watches made by Seiko, Casio, and Citizen. For example, a solar panel or photovoltaic cell can be put on the surface of the device. All of the units previously described are connected by a system bus.

Figure 2:
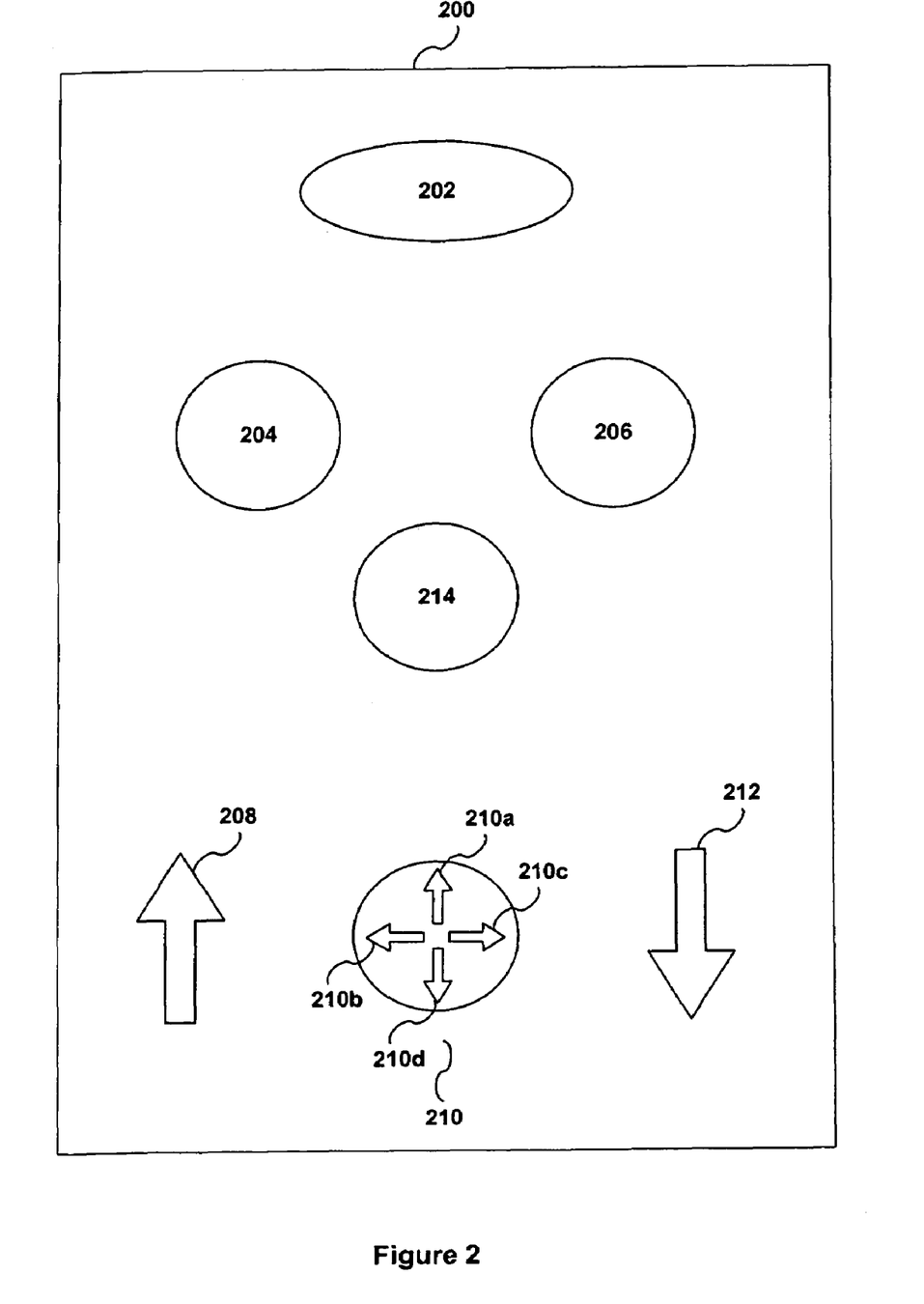
FIG. 2 is an example of the location device implemented in a vehicle key remote according to an embodiment of the present invention.

Referring to FIG. 2, an example of the location device implemented in a vehicle key remote according to an embodiment of the present invention is shown. In this embodiment, a vehicle key remote performs normal vehicle key remote operations in addition to the location operations of the present invention. For instance, door lock button 202 locks the vehicle doors, unlock button 204 unlocks the vehicle doors, trunk open button 206 unlocks and opens the trunk of the vehicle, and button 214 may be used as a panic button to flash the lights and sound the horn of the vehicle. Additionally, in this embodiment, door look button 202 is also used to initiate registration of a location. When the user presses the door lock button 202 longer than some predetermined time, such as two seconds, the current three-dimensional location of the location device is ascertained from the radio-based system unit 102 and stored in memory unit 108. Activation of the directional indicators is initiated when the user presses button 214. The current three-dimensional location of the location device is again ascertained from the radio-based system unit 102. Next, a relative three-dimensional direction is computed from the current location to the previously registered location. The relative three-dimensional direction is then displayed using directional indicators (208, 210 and 212). A user is directed towards a registered location using forward 210a, left 210b, right 210c, back 210d, up 208 and down 212 indicators. Up 208 and down 212 indicators are used to indicate the registered location altitude relative to the current altitude of the location device. Thus, if the registered location is higher or lower relative to the current altitude of the location device, this difference is indicated by up 208 and down 212 indicators, respectively. Each successive time that button 214 is pressed results in the recalculation and display of the relative three-dimensional direction from the current location to the registered location.

Optionally, the location device may be configured to periodically calculate and display, for some predetermined period of time after pressing button 214, the relative three-dimensional direction from the current location to the registered location. Additionally, indicators 208, 210 and 212 may optionally be configured with labels indicating their function.

It is to be understood that FIG. 2 illustrates just one of the many possible embodiments of the location device and that numerous variations are possible without departing from the scope of the present invention. It is also understood that FIG. 2 is an example of location device incorporated into a vehicle key remote. If the location device is instead an independent device, then only directional indicators (208, 210, and 212), buttons 202 and 214 are required and may be labeled accordingly. For instance, buttons 202 and 214 may be labeled "Remember Location" and "Get Directions," respectively.

Figure 3:
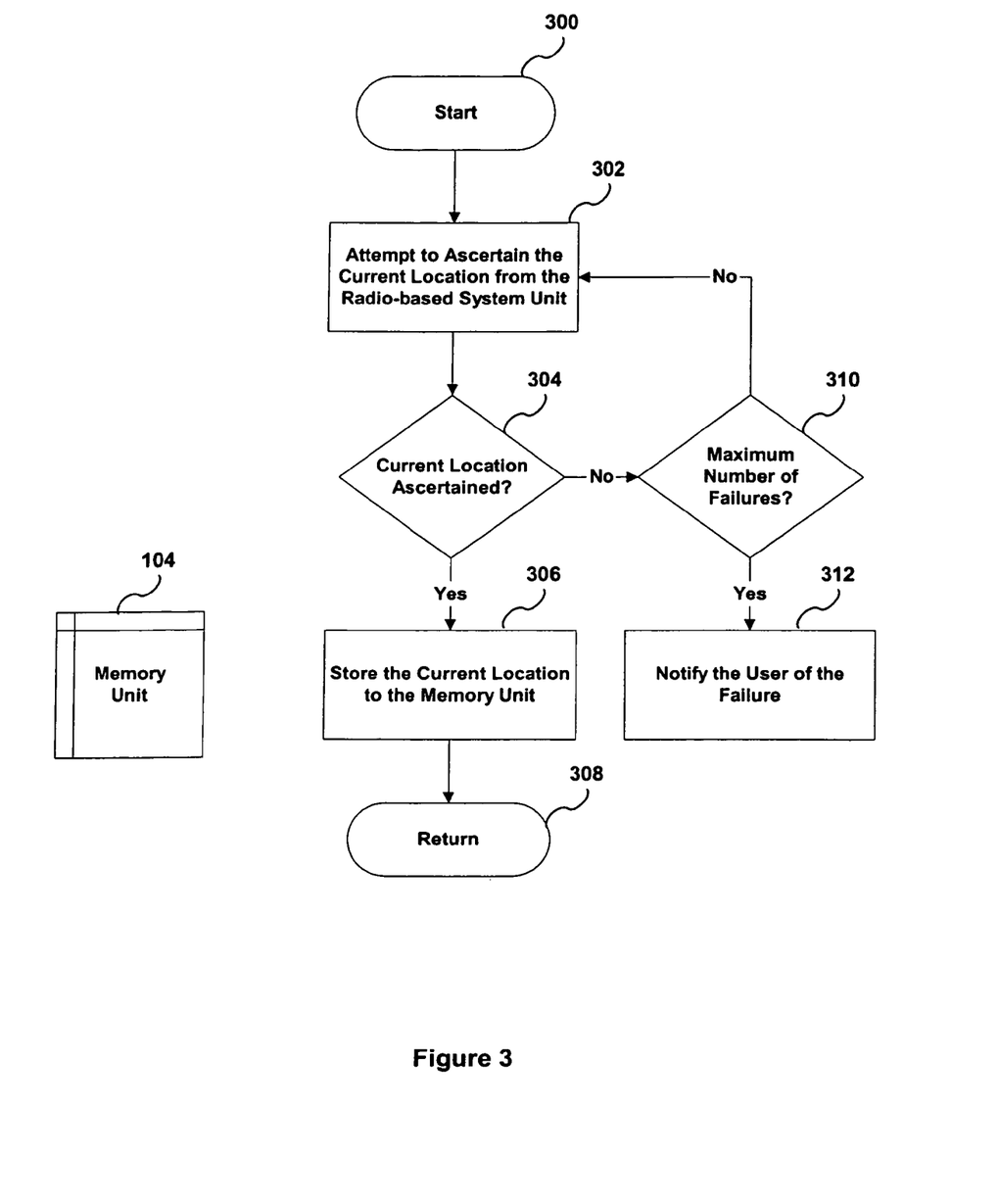
FIG. 3 is a flowchart illustrating the steps of registering a location according to an embodiment of the present invention.

Referring to FIG. 3, a flowchart of the steps for registering a location according to an embodiment of the present invention is shown. A user activates registration of a location, as shown at Block 300, by selecting button 202. At Block 302, the computational unit attempts to ascertain the current three-dimensional location from the radio-based system unit using an internal radio frequency receiver in communication with radio-based transmitters (e.g., at least four orbiting GPS space satellites or ground stations). This operation will continue, for a predetermined number of attempts, until the current three-dimensional location is ascertained by the radio frequency receiver. Logic Block 304 determines if the current location has been ascertained by the radio frequency receiver. If the current location has not been ascertained, then at Logic Block 310 a determination is made as to whether the number of failures has exceeded a predetermined maximum number of failures. If the maximum number of failures has not been exceeded, then flow continues at Block 302. Otherwise, as shown at Block 312, the user is notified that the location device is unable to ascertain the current location. Once the current location is ascertained, it is stored into memory unit 104, as shown at Block 306. This operation is referred to as registering a location that the user will later return to. Finally, as shown at Block 308, the registration steps are completed.

Figure 4:
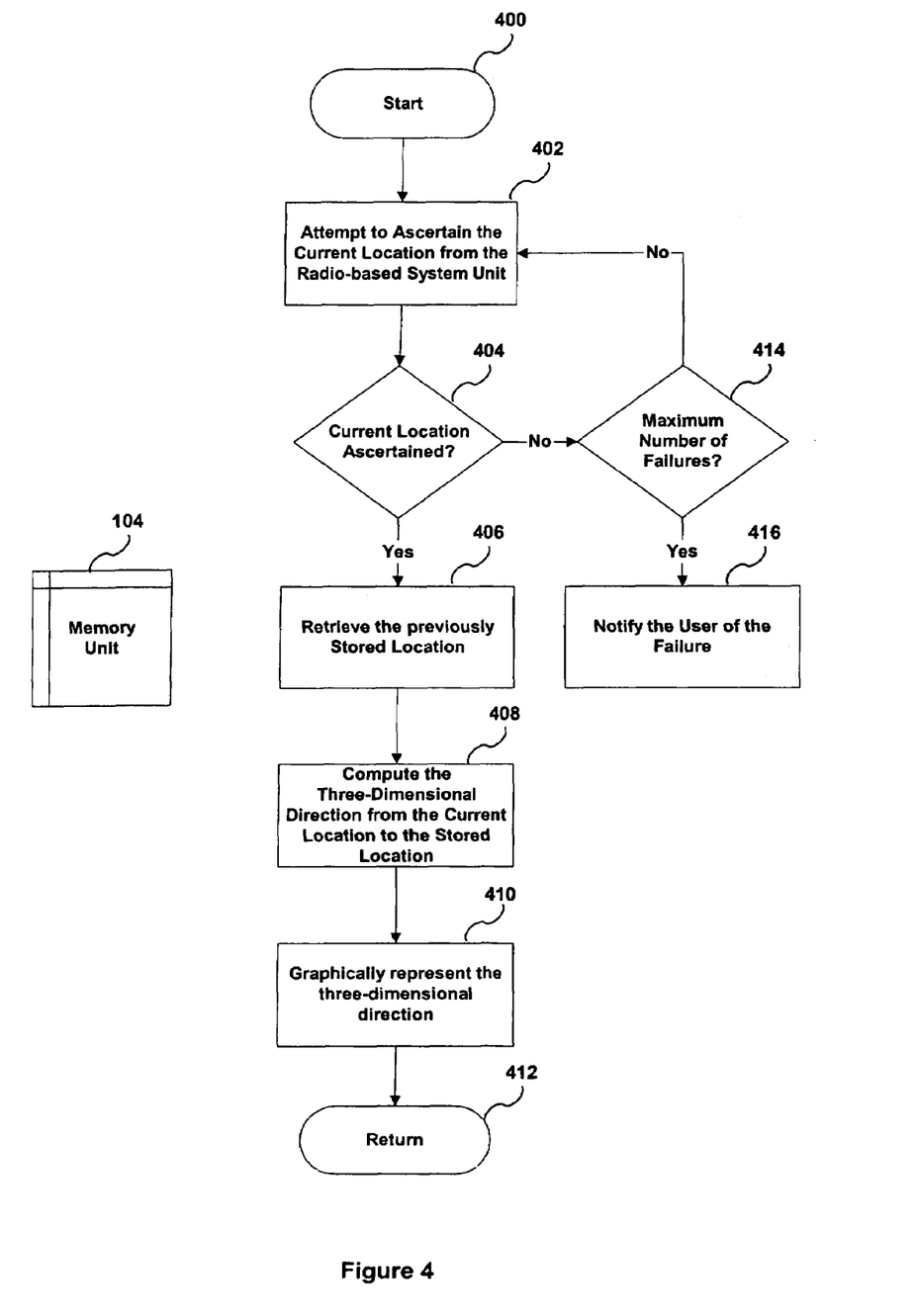
FIG. 4 is a flowchart illustrating the steps of getting the current location and representing a relative three-dimensional direction to the registered location according to an embodiment of the present invention on direction indicators.

Referring to FIG. 4, a flowchart of the steps for getting the current location and representing a relative three-dimensional direction to the registered location on direction indicators is shown. The user activates directions, shown at Block 400, by selecting button 214. At Block 402, the computational unit attempts to ascertain the current three-dimensional location from the radio-based system unit again using the internal radio frequency receiver in communication with radio-based transmitters (e.g., at least four orbiting GPS space satellites or ground stations). This operation will continue, for a predetermined number of attempts, until the current three-dimensional location is ascertained by the radio frequency receiver. Logic Block 404 determines if the current location has been ascertained by the radio frequency receiver. If the current location has not been ascertained, then at Block 414 a determination is made as to whether the number of failures has exceeded a predetermined maximum number of failures. If the maximum number of failures has not been exceeded, then flow continues at Block 402. Otherwise, as shown at Block 416, the user is notified that the location device is unable to ascertain the current location. Once the current location is ascertained, at Block 406, the previously stored location is retrieved from memory unit 104. Next, the relative three-dimensional direction from the current location to the registered location is calculated by the computational unit, as shown at Block 408. At Block 410, the three-dimensional direction is graphically displayed on the user interface using forward, left, right, back, up and down directional indicators. Finally, as shown at Block 412, the direction steps are completed.

Figure 5A:
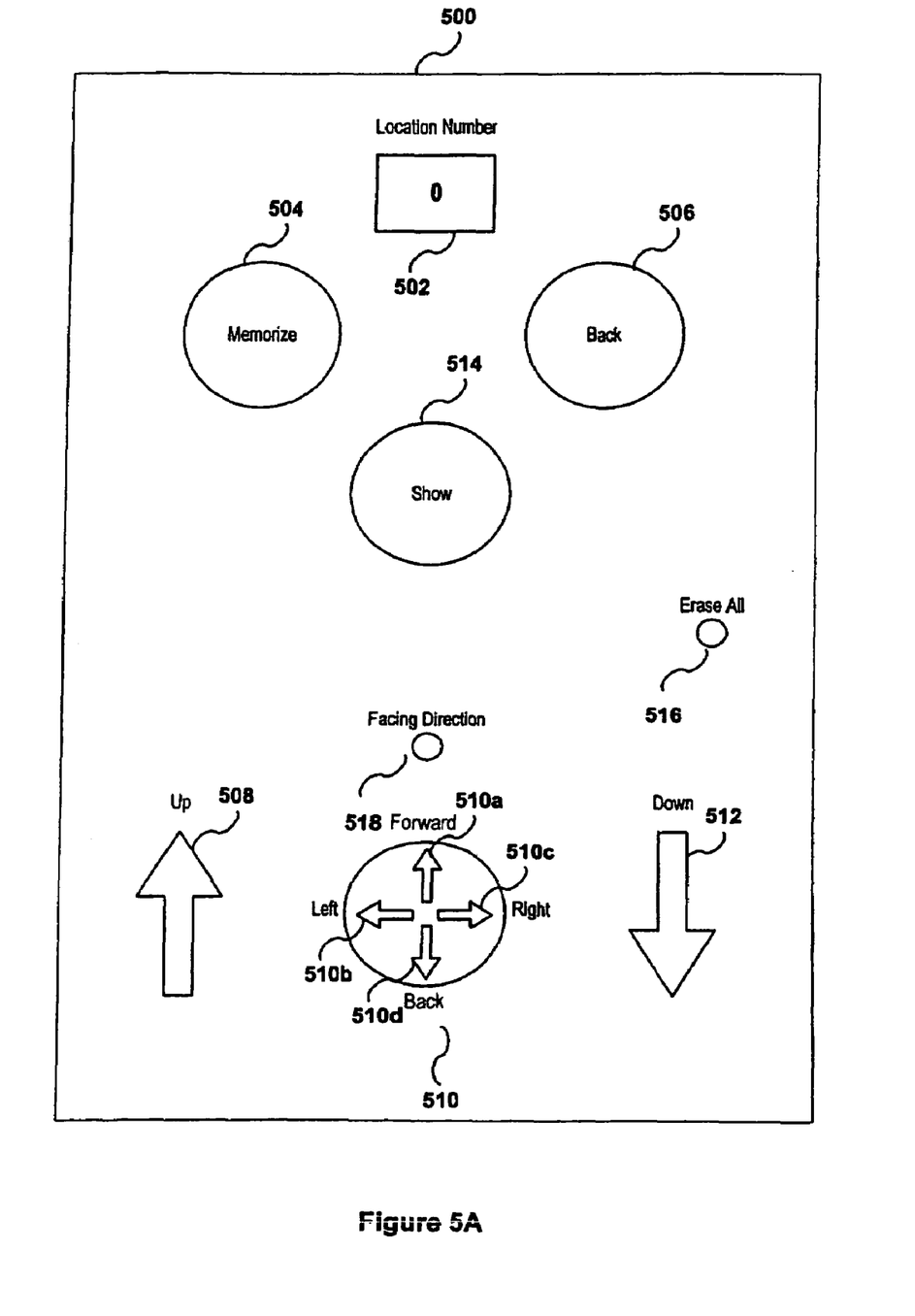
FIG. 5A-5C are examples of the location device incorporating a simple route-tracking mechanism according to alternate embodiments of the present invention.
Figure 5B:
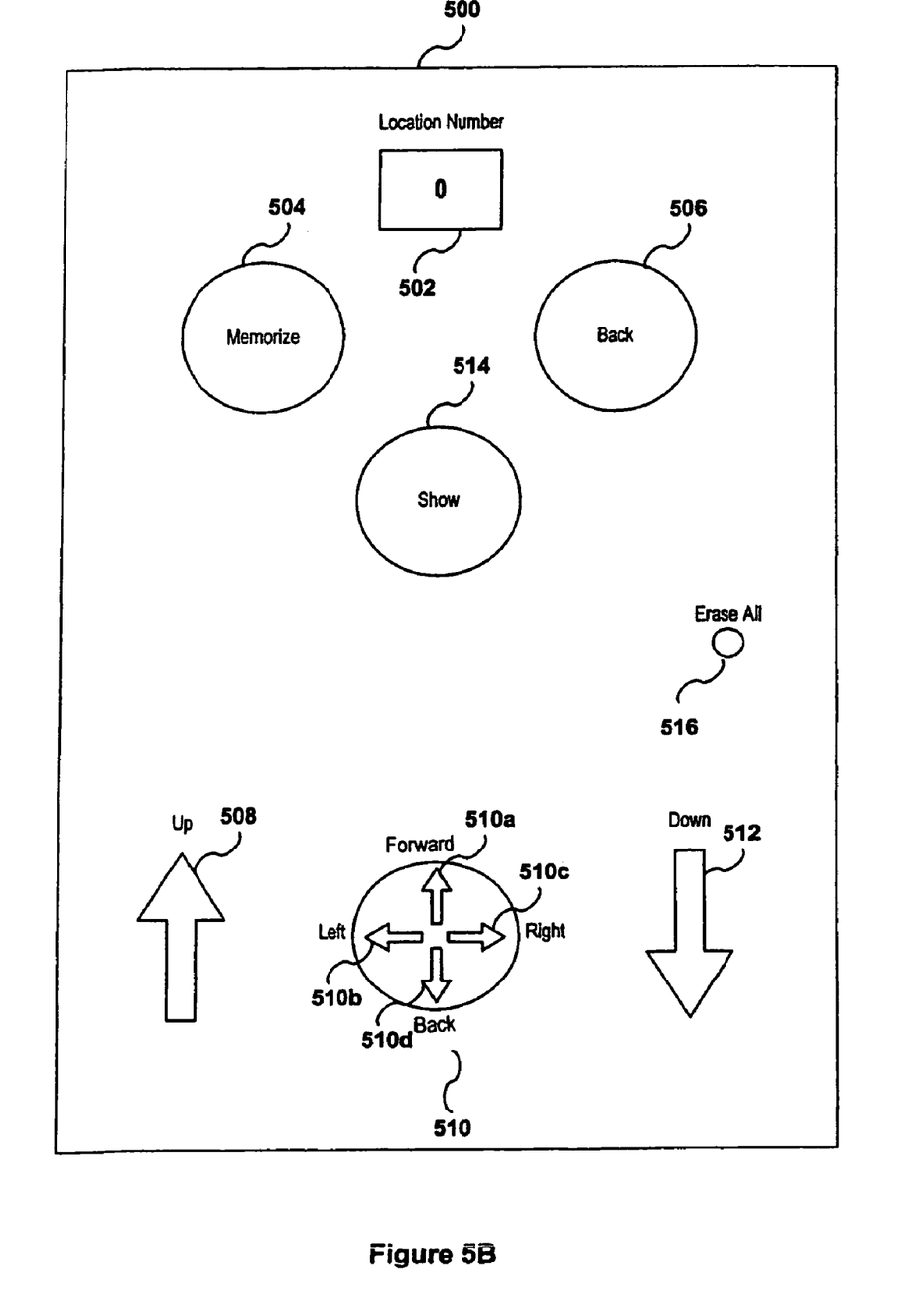
Figure 5C:
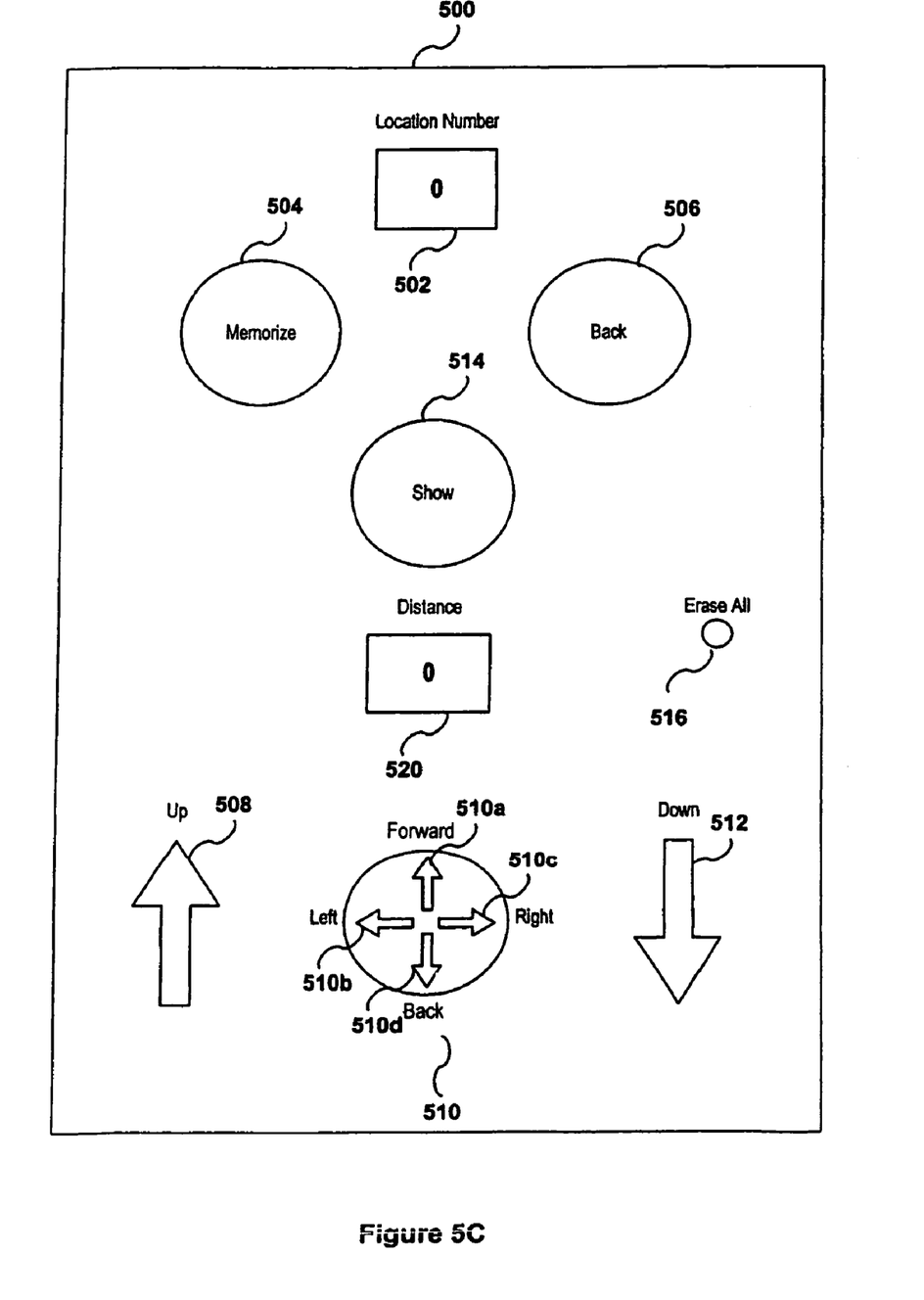

Referring to FIG. 5A, an alternate embodiment of the location device incorporating a simple route-tracking mechanism is shown. According to this embodiment, multiple locations may be registered by a user. Each registered location is associated with a unique location number that is visually represented in Location Number display 502. The first registered location, also referred to as the starting location, is identified by a location number of 0. Memorize button 504 stores the location number, the current location, and the direction that a user is currently facing. The location number is then automatically incremented. Back button 506 decrements the location number and retrieves its associated registered location and direction. By repeatedly pressing Back button 506, the user is able to rotate through each of the stored locations. Show button 514 activates the relative three-dimensional directional indicators (508, 510, and 512) which thereafter light up as necessary to direct a user towards a registered location. While the user is being directed towards a registered location, the light intensity of the directional indicators (508, 510, and 512) is varied, if necessary, to indicate a primary heading. For example, where a user facing north is being directed in a North-North-East direction, the forward 510a and right 510c directional indicators are simultaneously illuminated with forward 510a having a greater light intensity than right 510c, thereby providing the user with a visual indication of a primarily northern heading. Directional indicators 510 (forward 510a, left 510b, right 510c, back 510d) light up simultaneously when the user has arrived at a registered location. Because the registered location may only be accurate to within several feet or more, the original direction that the user was facing when the Memorize button 504 was pressed may be helpful in locating an exact location. Thus, upon arrival to a registered location, Facing Direction indicator 518 illuminates when the user faces the original direction registered when Memorize button 504 was pressed. Determining whether the user is facing the same registered direction may be implemented using a conventional internal compass configured to determine a direction relative to a magnetic north, not shown. Alternatively, as shown in FIG. 5B, directional indicators 510 (forward 510a, left 510b, right 510c, back 510d) flash one or more times when the user has arrived at a registered location and additionally light up as necessary to indicate the original direction registered when Memorize button 504 was pressed. The Erase All button 516 allows the user to clear all previously stored locations and acts as a reset. When the user presses the optional Erase All button 516 longer than some predetermined time, such as two seconds, all previously stored locations are cleared and the location number is set to 0. Additionally, a reset is performed when the user uses the Back button 506 to go back to the starting location and then presses Memorize button 504, thereby eliminating the need for Erase All button 516. Further, as shown in FIG. 5C, the location device may be configured with a distance display 520 to display the distance to a registered location. In this configuration, distance display 520 indicates 0 when the user has arrived at a registered location.

Although the interface is described in terms of the buttons, the operation can be done using the voice command. Also, the response can be voice response instead of the arrows. Therefore, a person can not only register the location, he can register a short message when memorizing a location so that the location number and his voice can be associated.

FIG. 2 is an example of remote key control of a vehicle, such as an automobile. In an alternative embodiment, instead of a solar panel, a kinetic battery charger can be used because the unit is likely to be stored in a pocket.

Figure 6:
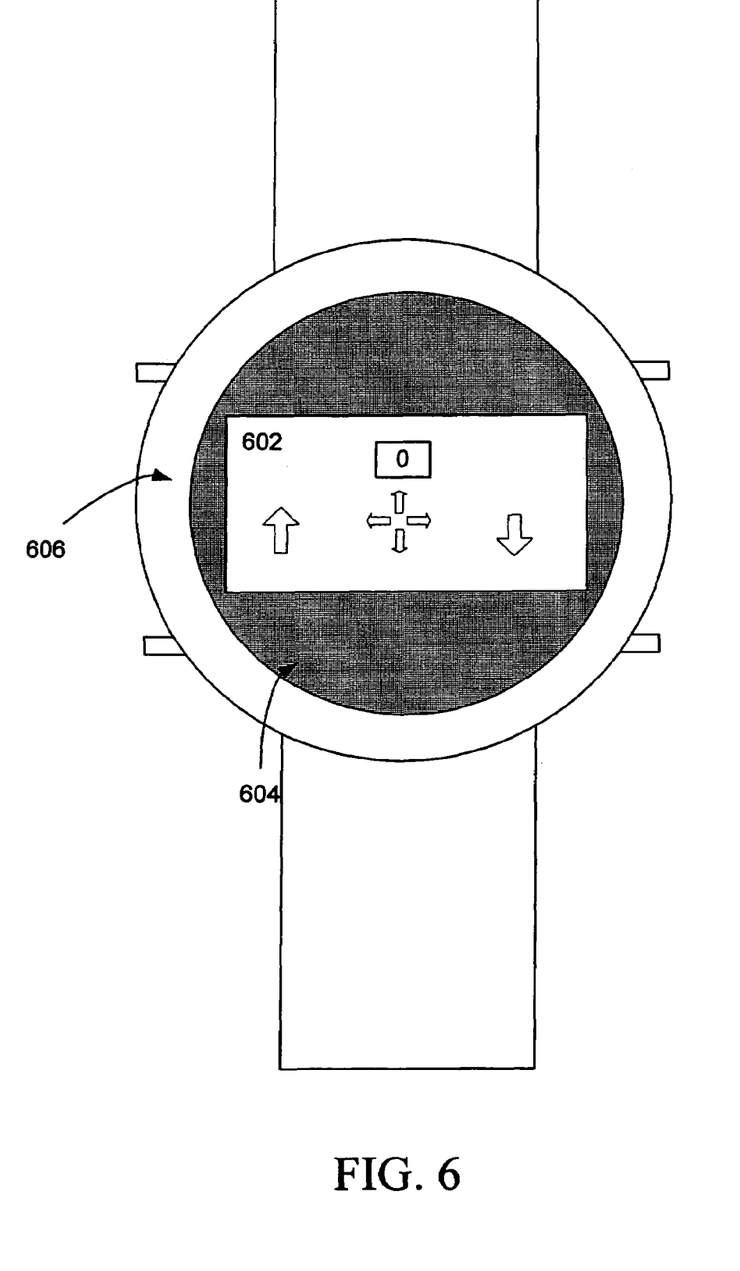
FIG. 6 is an example of an embodiment of the present invention in a wrist device or in a watch.

FIG. 6 is an example of an alternative embodiment of the present invention in a wrist device or in a watch. In the wrist device, an LED can be used for the direction indicators. In the watch, one of the buttons sticking out are control buttons similar to the watches from Casio. One of the buttons is a mode switch button to switch from clock mode to return location mode and to show the display 602. Area 604 is a solar panel. The other buttons can control the different functions described in conjunction with FIGS. 5A-5C. Another button can be added to control the lighting of the display for night use.

Figure 7:
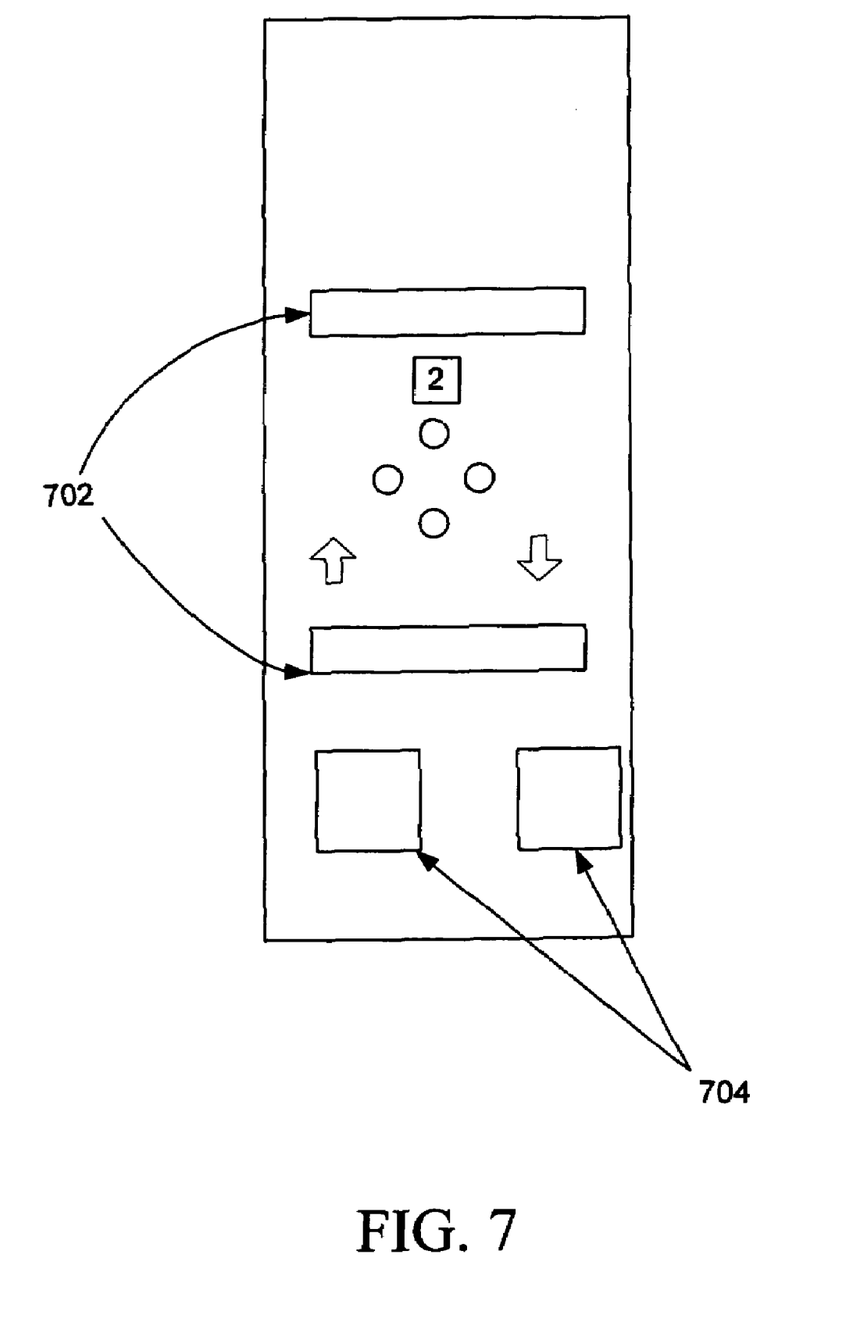
FIG. 7 is an example of another implementation of the present invention.

FIG. 7 is another example of an alternative embodiment of the present invention in a bracelet. Devices 702 are solar panels. Buttons 704 are two of the multiple buttons. Note that the implementation in a bracelet allows the use of a solar panel. In addition, an alternative design may hide the buttons and display into some decorative elements.

Obviously, numerous modifications and variations of the present invention are possible in light of the above teachings. It is therefore to be understood that within the scope of the appended claims, the invention may be practiced otherwise than as specifically described herein.

The invention claimed is:

1. A low-power location apparatus for returning a user to a location, comprising:
  a system unit configured to determine a current location using radio signals;
  a user interface unit having a low-power display area and first, second, and third buttons;
  a memory unit; and
  a computational unit configured to interact with the first and second buttons, wherein the computation unit retrieves one of a plurality of locations from the system unit and stores the one of the plurality of locations in the memory unit upon selection of the first button by the user, the computation unit retrieves the current location from the system unit and calculates a relative three-dimensional direction from the current location to the one of the plurality of locations upon selection of the second button by the user,
  wherein the relative three-dimensional direction is graphically represented on the low-power display area of the user interface unit, wherein the third button is configured to select one of the plurality of locations, and wherein each of plurality of locations are identified by a unique location number;
  the radio signals comprise Global Positional System (GPS) orbiting space satellite signals; and the low-power display area of the user interface unit includes left, right, forward, back, up, and down indicators to represent the relative three-dimensional direction, the location apparatus further comprising an internal compass configured to determine a direction relative to a magnetic north, wherein the computational unit further retrieves one of a plurality of directions from the internal compass and stores one of the plurality of directions and the one of the plurality of locations in the memory unit upon selection of the first button by the user, and the computational unit further retrieves a direction from the internal compass and graphically represents the direction relative to the stored one of the plurality of directions on the left, right, forward, and back indicators when the current location and the one of the plurality of locations are identical.

2. The location apparatus according to claim 1, wherein the low-power display area of the user interface unit includes a distance indicator to represent the relative three-dimensional distance from the location and one of the plurality of locations.

3. A low-power location apparatus for returning a user to a location, comprising:

a system unit configured to determine a current location using radio signals;

a user interface unit having a low-power display area and first, second, and third buttons;

a memory unit; and a computational unit configured to interact with the first and second buttons, wherein the computation unit retrieves one of a plurality of locations from the system unit and stores the one of the plurality of locations in the memory unit upon selection of the first button by the user, the computation unit retrieves the current location from the system unit and calculates a relative three-dimensional direction from the current location to the stored one of the plurality of locations upon selection of the second button by the user, wherein the relative three-dimensional direction is graphically represented on the low-power display area of the user interface unit, wherein the third button is configured to select one of the plurality of locations, and wherein each of plurality of locations are identified by a unique location number;

the radio signals comprise Global Positional System (GPS) orbiting space satellite signals;

the low-power display area of the user interface unit includes left, right, forward, back, up, and down indicators to represent the relative three-dimensional direction; and wherein the left, right, forward, and back indicators are simultaneously activated to represent that the location and the stored one of the plurality of locations are identical.

4. A low-power location apparatus for returning a user to a location, comprising:

a system unit configured to determine a current location using radio signals;

a user interface unit having a low-power display area and first, second, and third buttons;

a memory unit; and a computational unit configured to interact with the first and second buttons, wherein the computation unit retrieves one of a plurality of locations from the system unit and stores the one of the plurality of locations in the memory unit upon selection of the first button by the user, the computation unit retrieves the current location from the system unit and calculates a relative three-dimensional direction from the current location to the one of the plurality of locations upon selection of the second button by the user, wherein the relative three-dimensional direction is graphically represented on the low-power display area of the user interface unit, wherein the third button is configured to select one of the plurality of locations, and wherein each of plurality of locations are identified by a unique location number;

the radio signals comprise Global Positional System (GPS) orbiting space satellite signals; and the low-power display area of the user interface unit includes left, right, forward, back, up, and down indicators to represent the relative three-dimensional direction, the location apparatus further comprising an internal compass configured determine a direction relative to a magnetic north, wherein the low-power display area of the user interface unit further includes a direction indicator, and wherein the computational unit further retrieves one of a plurality of directions from the internal compass and stores the one of the plurality of directions and the one of the plurality of locations in the memory unit upon selection of the first button by the user, and the computational unit further retrieves a direction from the internal compass and activates the direction indicator when the current location and the stored one of the plurality of locations are identical, and the direction and the stored one of the plurality of directions are identical.

5. The location apparatus according to claim 4, wherein the left, right, forward, and back indicators are simultaneously activated to represent that the location and one of the plurality of locations are identical.

6. The location apparatus according to claim 5, wherein the low-power display area of the user interface unit further includes a location number display configured to represent the unique location number of the one of plurality of locations selected by the third button.

7. The location apparatus according to claim 6, wherein the user interface unit includes a fourth button configured to delete all of the plurality of locations and directions stored in the memory unit upon selection of the fourth button by the user.

8. The location apparatus according to claim 1, further comprising:

a self-charging unit, the self-charging unit including one of a solar panel, photovoltaic cell, and a kinetic charging device.

9. The location apparatus of claim 1, wherein the low-power display area of the user interface unit is an LED display.

10. The location apparatus of claim 1, wherein the low-power display area of the user interface unit is a wrist-watch size LCD display.

11. The location apparatus of claim 1, wherein the location apparatus is incorporated in a car key having door lock and unlock buttons.

12. The location apparatus of claim 1, wherein the location apparatus is incorporated into a wrist watch.

* * * * *

UNITED STATES PATENT AND TRADEMARK OFFICE
CERTIFICATE OF CORRECTION

PATENT NO. : 7,432,854 B2  Page 1 of 1
APPLICATION NO. : 11/109640
DATED : October 7, 2008
INVENTOR(S) : Motoyama

It is certified that error appears in the above-identified patent and that said Letters Patent is hereby corrected as shown below:

On the title page, Item (75), the Inventor information is incorrect. Item (75) should read:

-- (75) Inventor: Tetsuro Motoyama, Cupertino, CA (US) --

Signed and Sealed this

Second Day of December, 2008

JON W. DUDAS
*Director of the United States Patent and Trademark Office*